United States Patent
Du (10) Patent No.: US 8,995,759 B2
(45) Date of Patent: Mar. 31, 2015

(54) IMAGE PROCESSING APPARATUS AND IMAGE PROCESSING METHOD

(75) Inventor: Cheng Du, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 519 days.

(21) Appl. No.: 13/354,586

(22) Filed: Jan. 20, 2012

(65) Prior Publication Data

US 2012/0213427 A1    Aug. 23, 2012

(30) Foreign Application Priority Data

Feb. 22, 2011  (CN) .......................... 2011 1 0042595

(51) Int. Cl.
*G06K 9/62* (2006.01)
*H04N 1/56* (2006.01)
*G06K 9/46* (2006.01)

(52) U.S. Cl.
CPC ............... *H04N 1/56* (2013.01); *G06K 9/4652* (2013.01); *G06K 9/6212* (2013.01)
USPC .......................................................... 382/159

(58) Field of Classification Search
None
See application file for complete search history.

(56) References Cited

U.S. PATENT DOCUMENTS

| 7,170,638 | B2 * | 1/2007 | Ito ................................... 358/1.9 |
| 7,953,273 | B2 * | 5/2011 | Nam et al. .................... 382/164 |
| 2009/0169073 | A1 * | 7/2009 | Areste et al. .................. 382/128 |
| 2010/0053376 | A1 * | 3/2010 | Fukuda ......................... 348/235 |
| 2010/0074523 | A1 | 3/2010 | Ishiga | |

OTHER PUBLICATIONS

Shen Bin, Yao Min, Zhanng Yan-Gu, et al., "Application of Multiclass SVM for Kansei Landscape Image Retrieval Using Colour and Kansei Factors", 2005, MIPPR, SAR and Multispectral Image Processing, SPIE vol. 6043.*

* cited by examiner

*Primary Examiner* — Kim Vu
*Assistant Examiner* — Fred Hu
(74) *Attorney, Agent, or Firm* — Oblon, McClelland, Maier & Neustadt, L.L.P.

(57) ABSTRACT

Disclosed are an image processing apparatus and an image processing method. The image processing apparatus comprises a matching degree calculation unit configured to calculate respective matching degrees between an image waiting for processing and plural training images whose Kansei scores are pre-designated; and a Kansei score calculation unit configured to extract, from the plural training images, a predetermined number of training images corresponding to the maximum matching degree, and then based on the Kansei scores of the extracted training images with regard to a selected Kansei type, calculate a Kansei score of the image waiting for processing.

8 Claims, 4 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method, and particularly relates to an image processing apparatus and an image processing method for carrying out processing with regard to an emotional value (also called "Kansei score"; hereinafter the emotional value is called the "Kansei score") of an image.

2. Description of the Related Art

What images express is not only information but also affection of human beings, etc. For example, some images may let people associate with warmth; some images may let people feel cold; some images may embody vivid scenes; and some images may look lifeless. The affection of human beings triggered by an image is called "Kansei". Here it should be noted that even for a same image, different observers may have different realizations of Kansei; also even for a same observer, in different circumstances, he may have different realizations of Kansei with regard to a same image. However, in general, most observers may have a same realization of Kansei with regard to a same image; as a result, the realization of Kansei may be quantified. The value obtained by carrying out quantification with regard to the realization of Kansei is called the "Kansei score".

With the developments of Internet techniques, many people publish their photos through social networks so as to share their affections, and hope that their expected realization of Kansei may be acquired by other viewers after the photos are viewed. This means that there exists a requirement of quantifying realization of Kansei of an image, i.e., obtaining a Kansei score. Furthermore, in many circumstances, people may find that their photos cannot bring their expected realization of Kansei to other viewers. As a result, before an image is published, it may be necessary to adjust the image so as to let the Kansei score of the image be equal to or at least approach the expected Kansei score. However, at present, there does not exist a means of estimating a Kansei score of an image, better suited for an ordinary user (i.e., a non-expert of image processing). In addition, even in a case where the user knows his expected Kansei score of an image, there also does not exist a simple and automatic means by which the user may adjust the Kansei score of the image to be equal to or approach the expected Kansei score.

The below cited reference No. 1 proposes an image enhancement means. According to selection of an emotional expression such as "sharp" or "mild", an editing command creating device in a personal computer creates editing commands for image data. Parameters and steps of image processing are adjusted by an input state setting device based on features of a display unit of the personal computer, and then the processed image is displayed on the display unit. The created editing commands are transmitted to a laboratory to serve as overall emotional expression scripts. In the laboratory, according to the overall emotional expression scripts, the image processing is carried out with regard to the image data. At this time, an output state setting device changes the parameters of the image processing according to features of an output medium. The processed image data is output, by an output device, to the corresponding output medium. In this image enhancement means, as for a problem that realization of Kansei of a same image shown on different display units may be different due to innate features of the different display units, a user may press, for example, a "sharp" button to let the image look sharp; in order to let the image achieve a good effect, the button may need to be pressed many times. However, this image enhancement means does not relate to the Kansei score, and does not try to quantify the realization of Kansei of the image. In other words, this image enhancement means just carries out calculation and adjustment processing with regard to concrete image feature parameters, and is a semi-automatic means. As a result, the user needs to perform operation many times (for example, to press a button many times) in order to approach an expected result.

The below cited reference No. 2 provides a means of classifying images into various Kansei types. This means comprises a step of carrying out multi-resolution expression with regard to an image; a step of carrying out image synthesis by integrating plural high-frequency sample images; a step of creating a histogram of the synthesized image; and a step of carrying out image classification according to the histogram. The means in this reference tries to build a direct mapping relationship between an image histogram and image Kansei, i.e., tries to build direct mapping from image features to Kansei realization, so as to assign a Kansei type to an image; however, since Kansei of an image is delicate and complicated, the built direct mapping from the image features to the Kansei realization is almost always incorrect. In addition, the means in this reference also does not relate to carrying out quantization with regard to Kansei realization of an image; for example, although an image is classified as "warm", it is not provided how warm the image is, i.e., a Kansei score with regard to warm is not provided.

Cited Reference No. 1: U.S. Pat. No. 7,170,638 B2

Cited Reference No. 2: US Patent Application Publication No. 2010/0074523 A1

SUMMARY OF THE INVENTION

The present invention is proposed for solving the above described problems in the conventional techniques. Although it is difficult to build direct mapping from image features to Kansei realization (in other words, the direct mapping built in this way is almost always incorrect), this implies that there is a high association between the image features and the Kansei realization. For example, an image in which the color of a goodly portion is orange or red may express a warm feeling, and an image including various colors, having relatively high color saturation degree may bring a vivid feeling. Based on these kinds of well-known knowledge, in embodiments of the present invention, image features that are highly related to Kansei realization are utilized to retrieve, from a set of training images, an image expressing Kansei realization similar to that expressed by an image waiting for processing; then the Kansei score of the retrieved image is used to determine (calculate) the Kansei score of the image waiting for processing. Here it should be noted that the training images in the set have been given predetermined individual Kansei scores in advance.

In addition, a user may also carry out the embodiments of the present invention by pre-determining an expected Kansei score for the image waiting for processing so that in a case where the Kansei score of the image waiting for processing is different from the expected Kansei score, the Kansei score of the image waiting for processing may be adjusted to be equal to or approach the expected Kansei score; in this way, the image waiting for processing may bring the expected Kansei realization. Since it is difficult to build a direct relationship from image features to image Kansei scores, it is hard to select parameters for carrying out adjustment of the image features. In the embodiments of the present invention, if the difference between the calculated Kansei score and the expected Kansei score is too big, an image adjustment parameter is calculated, then the image adjustment parameter is used to adjust the image waiting for processing, and then the Kansei score of the image waiting for processing is calculated again; this kind of operation is repeated until the Kansei score of the image waiting for processing is equal to or approaches the expected Kansei score. In this way, as long as the expected Kansei score is pre-determined by the user, the adjustment of the image waiting for processing may be fully automatically carried out.

As a result, an image processing apparatus and an image processing method for carrying out processing with regard to a Kansei score of an image are proposed in the embodiments of the present invention. By using the image processing apparatus and the image processing method, it is possible to estimate Kansei realization of the image, to provide a quantified Kansei score, and to further adjust the Kansei score of the image to equal to or approach an expected Kansei score.

According to an embodiment of the present invention, an image processing apparatus is provided. The image processing apparatus comprises a matching degree calculation unit configured to calculate respective matching degrees between an image waiting for processing and plural training images whose Kansei scores are pre-designated; and a Kansei score calculation unit configured to extract, from the plural training images, a predetermined number of training images corresponding to the maximum matching degree, and then based on the Kansei scores of the extracted training images with regard to a selected Kansei type, calculate a Kansei score of the image waiting for processing.

According to another embodiment of the present invention, an image processing method is provided. The image processing method comprises a matching degree calculation step of calculating respective matching degrees between an image waiting for processing and plural training images whose Kansei scores are pre-designated; and a Kansei score calculation step of extracting, from the plural training images, a predetermined number of training images corresponding to the maximum matching degree, and then based on the Kansei scores of the extracted training images, calculate a Kansei score of the image waiting for processing.

By adopting the embodiments of the present invention, after a user inputs an image and selects a Kansei type, it is possible to obtain a Kansei score of the image with regard to the selected Kansei type, and then by further designating an expected Kansei score, it is possible to automatically adjust the input image so as to let the image have an expected Kansei expression.

Furthermore, by adopting the embodiments of the present invention, a user may acquire a Kansei score of an image; the Kansei score may be utilized by a search engine for carrying out retrieval. For example, it is possible to use a Kansei score to retrieve images, and the retrieved images may be ranked according to their Kansei scores.

As a result, the embodiments of the present invention may let a user simply and conveniently know a Kansei score of an image, and may let the image have an expected Kansei expression. Furthermore the embodiments of the present invention may also be used by a search engine, and may let the search engine achieve image retrieval with regard to a Kansei score.

DETAILED DESCRIPTION OF THE PREFERRED EMBODIMENTS

Hereinafter, various embodiments of the present invention will be concretely described with reference to the drawings. However it should be noted that the same symbols, which are in the specification and the drawings, stand for constructional elements having the basically-same function and structure, and repeated explanations for the constructional elements are omitted.

In the embodiments of the present invention, an image processing apparatus and an image processing method for carrying out processing with regard to a Kansei score of an image are provided. In general, the Kansei score may be expressed regarding a pair of words that have opposite (or near-opposite) meanings, for example, "warm" and "cold", "vivid" and "lifeless". A set of training images needs to be determined in advance; the training images in the set have been given predetermined Kansei scores according to different Kansei types, respectively. For example, as for degree of warmth, the training images are given a certain range of scores. In particular, a training image that expresses a warmest feeling is given a score of 100; a training image that expresses a coldest feeling is given a score of 0; and other training images are given scores between 0 and 100. In other words, Kansei scores of training images in a same set with regard to a same Kansei type (for example, degree of warmth) are within a predetermined range. Also training images may be given Kansei scores with regard to other Kansei types. For example, a training image that looks most vivid is given a highest score, and a training image that looks most lifeless is give a lowest score; that is, the more vivid a training image looks, the higher the score of the training image is. In addition, Kansei scores of training images in a same set with regard to different Kansei types may be within a same range or different ranges, and the size of the ranges may be the same or different; as a result, Kansei scores of a same image with regard to different Kansei types may be different. It is possible to let Kansei scores of training images in a same set with regard to different Kansei types be within the same range; however, those people skilled in the art should understand that although this kind of normalization processing is not performed, the embodiments of the present invention may carry it out too.

Figure 1:
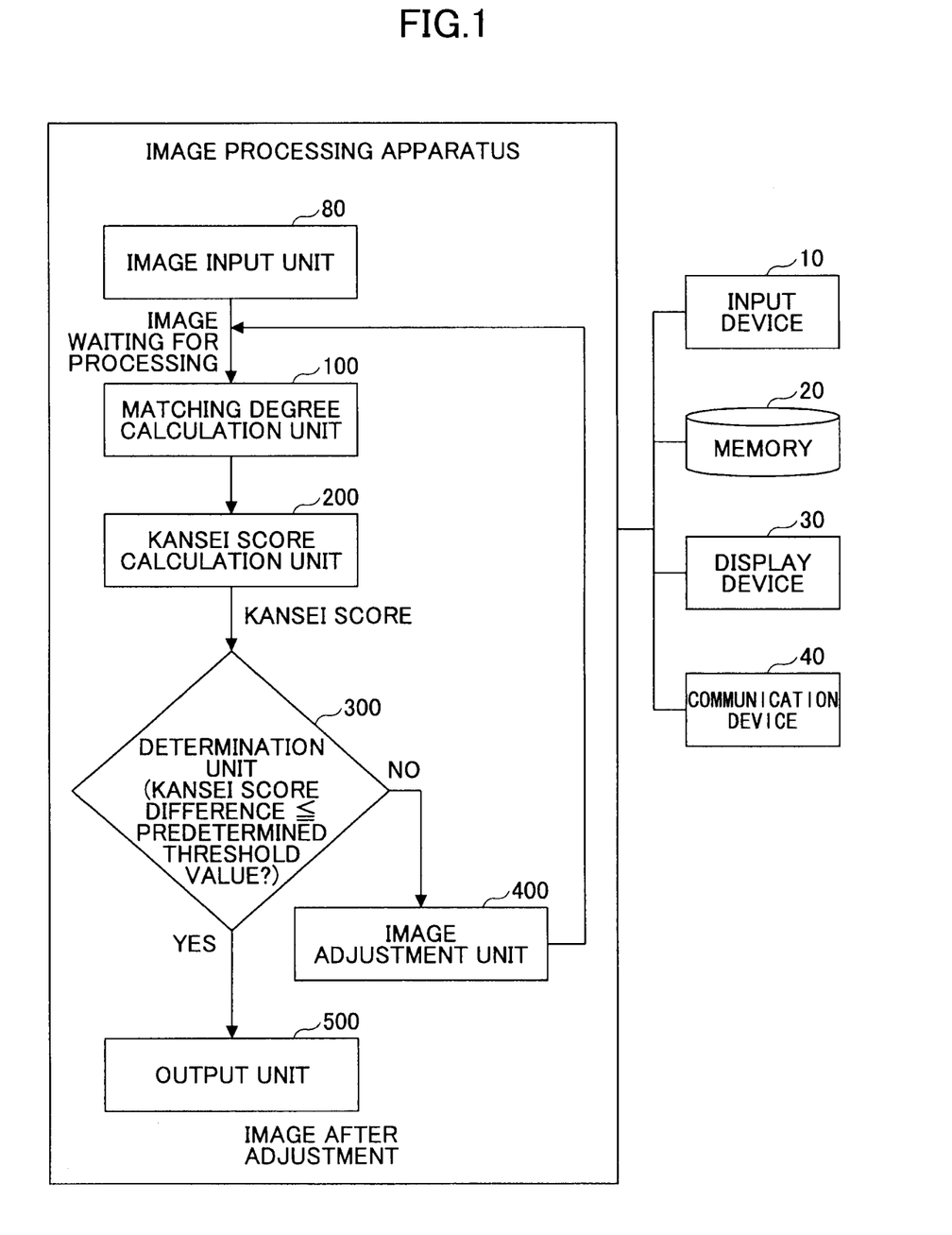
FIG. 1 is an overall block diagram of an image processing apparatus according to an embodiment of the present invention.

FIG. 1 is an overall block diagram of an image processing apparatus according to an embodiment of the present invention.

As shown in FIG. 1, the image processing apparatus may be connected to an input device 10, a memory 20, a display device 30, and a communication device 40. The image processing apparatus comprises a matching degree calculation unit 100 configured to calculate respective matching degrees between an image waiting for processing and plural training images that have been given plural predetermined Kansei scores; and a Kansei score calculation unit 200 configured to extract, from the plural training images, a predetermined number of training images corresponding to the maximum matching degree, and then based on the predetermined Kansei scores of the extracted training images with regard to a selected Kansei type, calculate a Kansei score of the image waiting for processing.

The image processing apparatus may further include an image input unit 80. The image waiting for processing is input by a user via the image input 80; also the selected Kansei type, by which the Kansei score of the image waiting for processing is calculated, is selected by the user from plural predetermined Kansei types too. By carrying out comparison with regard to similarity between the input image and the training images in a training image set, it is possible to select, from the training image set, N (N is a counting number) images most similar to the input image. Then the predetermined Kansei scores of these N images with regard to the selected Kansei type are utilized to determine the Kansei score of the input image with regard to the selected Kansei type; the obtained Kansei score of the input image may be provided to the user by using various conventional techniques. Here those people skilled in the art should understand that the user may select various Kansei types one time, and then the image processing apparatus may carry out processing with regard to the various Kansei types so as to obtain plural Kansei scores of the input image with regard to the various Kansei types.

Up to here, how to achieve a function of estimating a Kansei score of an image by using the image processing apparatus according to the embodiment of the present invention has been illustrated.

As an improvement of the image processing apparatus according to the embodiment of the present invention, the image processing apparatus may further comprise a determination unit 300 configured to calculate a Kansei score difference between the obtained Kansei score of the image waiting for processing and an expected Kansei score, and then determine whether the Kansei score difference is greater than a predetermined threshold value; and an image adjustment unit 400 configured to adjust, in a case where the determination unit 300 determines that the Kansei score difference is greater than the predetermined threshold value, the image waiting for processing, and then return the image after adjustment to the matching degree calculation unit 100 to serve as a new image waiting for processing.

The expected Kansei score is designated by a user. Those people skilled in the art should understand that both the expected Kansei score and the Kansei score of the image waiting for processing, calculated by the Kansei score calculation unit 200, should belong to the same Kansei type, or the Kansei type of the expected Kansei score at least belongs to the Kansei types of the plural Kansei scores calculated by the Kansei score calculation unit 200. Furthermore those people skilled in the art should understand that the expected Kansei score input by the user should be within the range of the Kansei scores given to the training images in the training image set with regard to the corresponding Kansei type. In addition, those people skilled in the art should understand that the predetermined threshold value may be not only designated by the user but also set by the image processing apparatus, and may be not only constant but also adjusted in each operational process.

The image processing apparatus according to the embodiment of the present invention may further comprise an output unit 500 configured to output, in a case where the determination unit 300 determines that the Kansei score difference is less than or equal to the predetermined threshold value, the image waiting for processing as an output image. Actually the output image output by the output unit 500 is an image having the Kansei score difference, between the Kansei score of the image with regard to the selected Kansei type and the expected Kansei score with regard to the selected Kansei type, less than the predetermined threshold value.

In an embodiment of the present invention, in a case where the Kansei scores given to the training images with regard to a selected Kansei type are, for example, from 0 to 100, the predetermined threshold value may be, for example, 5, 10, or 20. It is obvious that these kinds of predetermined threshold values are just examples. In a case where the Kansei score difference is greater than the predetermined threshold value, the image adjustment unit 400 utilizes the Kansei score difference to calculate an image adjustment parameter, and then uses the image adjustment parameter to carry out the image adjustment processing, i.e., adjusts image features. Here it should be noted that the aim is not to build direct mapping from the image features to the image Kansei scores, whereas an image whose image features are adjusted is fed back to the matching degree calculation unit 100 to serve as a new image waiting for processing. This kind of operation is repeatedly carried out until in an operation the difference between the current Kansei score of the image waiting for processing and the expected Kansei score is less than or equal to the predetermined threshold value; then the image waiting for processing is output as the output image.

Figure 2:
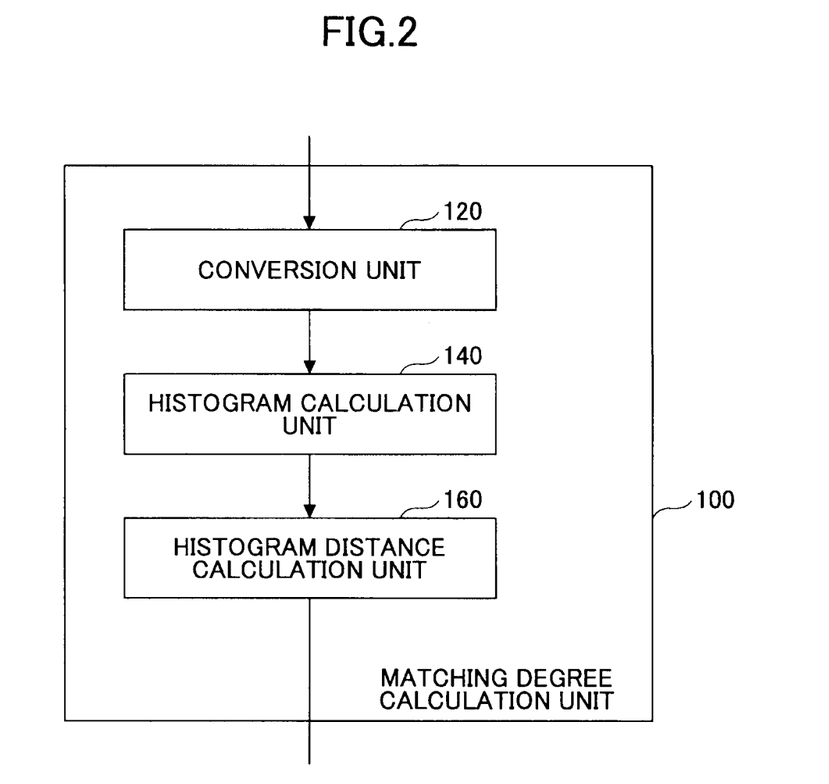
FIG. 2 is a block diagram of a matching degree calculation unit according to an embodiment of the present invention.

FIG. 2 is a block diagram of the matching degree calculation unit 100 according to an embodiment of the present invention.

As shown in FIG. 2, the matching degree calculation unit 100 comprises a conversion unit 120 configured to convert an image waiting for processing from an RGB color space to a HSV color space; a histogram calculation unit 140 configured to calculate, in the HSV color space, a color histogram of the image waiting for processing; and a histogram distance calculation unit 160 configured to calculate respective color histogram distances between the image waiting for processing and plural training images to serve as respective matching degrees between the image waiting for processing and the plural training images.

The conversion unit 120 converts, for each of pixels of the image waiting for processing, RGB (i.e. the three primary colors: red, green, and blue) values of the corresponding pixel into HSV (H stands for Hue; S stands for Saturation; and V stands for Value.) values. The RGB space, the HSV space, and conversion methods between the two are prescribed by International Color Consortium (ICC). As for conversion from the RGB space to the HSV space, for example, it may be achieved by using the following equations (1)-(3). However, those people skilled in the art should understand that other conversion equations may be utilized in the conversion unit 120 according to the embodiment of the present invention too.

$$h = \begin{cases} 0° & \text{if max} = \text{min} \\ 60° \times \frac{g-b}{\max - \min} + 0° & \text{if max} = r \text{ and } g \geq b \\ 60° \times \frac{g-b}{\max - \min} + 360° & \text{if max} = r \text{ and } g < b \\ 60° \times \frac{g-b}{\max - \min} + 120° & \text{if max} = g \\ 60° \times \frac{g-b}{\max - \min} + 240° & \text{if max} = b \end{cases} \quad (1)$$

$$s = \begin{cases} 0 & \text{if max} = 0 \\ 1 - \frac{\min}{\max} & \text{other cases} \end{cases} \quad (2)$$

$$v = \max \quad (3)$$

Here r, g, and b refer to RGB values (i.e. R value, G value, and B value) of a pixel; max refers to max(r, g, b), i.e., the maximum value of r, g, and b; min refers min(r, g, b), i.e., the minimum value of r, g, and b; h, s, and v refer to HSV values (i.e. H value, S value, and V value) of the pixel.

The histogram calculation unit 140 calculates the color histogram of the image waiting for processing. It is assumed that the H value of the image waiting for processing is divided into H_Bins levels, and their corresponding values are from 0 to H_Bins−1; the S value of the image waiting for processing is divided into S_Bins levels, and their corresponding values are from 0 to S_Bins−1; and the V value of the image waiting for processing is divided into V_Bins levels, and their corresponding values are from 0 to V_Bins−1, where H_Bins, S_Bins, and V_Bins are counting numbers. In this way, the number of image levels in the whole color histogram (i.e. columns in the whole color histogram) may be expressed by the following equation (4).

$$\text{Total\_Bins} = H\_Bins \times S\_Bins \times V\_Bins \quad (4)$$

Here Total_Bins refers to the number of image levels in the whole color histogram.

Each of the pixels of the image waiting for processing is analyzed; the HSV value of the corresponding pixel is (h, s, v). It is assumed that the image level of the corresponding pixel is h×S_Bins×V_Bind+s×V_Bins+v. In other words, the respective pixels of the whole image waiting for processing need to be scanned. Each of the pixels is assigned to a column whose image level is h×S_Bins×V_Bind+s×V_Bins+v; 1 is added to the value, of the column each assignment. Those people skilled in the art should understand that it is also possible to use other methods to prescribe the image level of the corresponding pixel, for example, s×H_Bins×V_Bins+h×V_Bins+v. As an example, it is possible to let H_Bins=18, S_Bins=8, and V_Bins=4. Those people skilled in the art should understand that it is also possible to give other values to H_Bins, S_Bins, and V_Bins based on design requirements and tendency, for example, to let H_Bins=8, S_Bins=16, and V_Bins=10.

The histogram distance calculation unit 160 carries out matching between the input image waiting for processing and all of the training images in a training image set. For example, it is possible to adopt the following equation (5) to calculate a color histogram distance between the image waiting for, processing and a training image.

$$\text{dis}_{q,t} = (h_q - h_t)^T A (h_q - h_t) \quad (5)$$

Here $\text{dis}_{q,t}$ refers to the color histogram distance. $h_q$ refers to the color histogram of the image waiting for processing, and is a vector whose dimension is Total_Bins (the number of the image levels i.e. the number of the columns in the histogram). $h_t$ refers to the color histogram of the training image, and also is a vector whose dimension is Total_Bins. The color histograms of the image waiting for processing and the training image are prescribed according to a same method. T refers to carrying out transposing with regard to a vector. A refers to a matrix in which the number of rows is Total_Bins, and the number of columns is also Total_Bins. An element at the i-th row and the j-th column is expressed as $a_{i,j}$; i and j are counting numbers whose values may be from 1 to Total_Bins. $a_{i,j}$ may be defined as follows:

$$a_{i,j} = 1 - \frac{1}{\sqrt{k_1^2 + 4 + k_2^2}} [k_1 \times (V_i - V_j)^2 + k_2 \times (S_i \cos H_i - S_j \cos H_i)^2 + k_2 \times (S_i \sin H_i - S_i \sin H_i)^2]^{0.5};$$

here $H_i = (i/(S\_Bins \times V\_Bins)) \times (360/H\_Bins)$, $S_i = ((i \mod (S\_Bins \times V\_Bins))/S\_Bins)/V\_Bins$, $V_i = (i \mod(S\_Bins)/$ S_Bins, $k_1$ and $k_2$ are adjustable parameters. As an example, it is possible to let $k_1=2$, and $k_2=1$. Those people skilled in the art should understand that $k_1$ and $k_2$ may be given other values based on design requirements and tendency, for example, 3 and 0.3.

Also $a_{i,j}$ may be defined as follows:

$$a_{i,j} = 1 - \frac{1}{\sqrt{k_1^2 + k_2^2 + k_3^2}} [k_1 \times (V_i - V_j)^2 + k_2 \times (S_i - S_j)^2 + k_3 \times (H_i - H_i)^2]^{0.5};$$

here $H_i = (i/(S\_Bins \times V\_Bins)) \times (360/H\_Bins)$, $S_i = ((i \mod (S\_Bins \times V\_Bins))/S\_Bins)/V\_Bins$, $V_i = (i \mod S\_Bins)/S\_Bins$, $k_1$, $k_2$, and $k_3$ are adjustable parameters. As an example, it is possible to let $k_1=2$, $k_2=1$, and $k_{23}=1$. Those people skilled in the art should understand that $k_1$, $k_2$, and $k_3$ may be given other values based on design requirements and tendency, for example, 1.5, 0.3, and 0.5.

Figure 3:
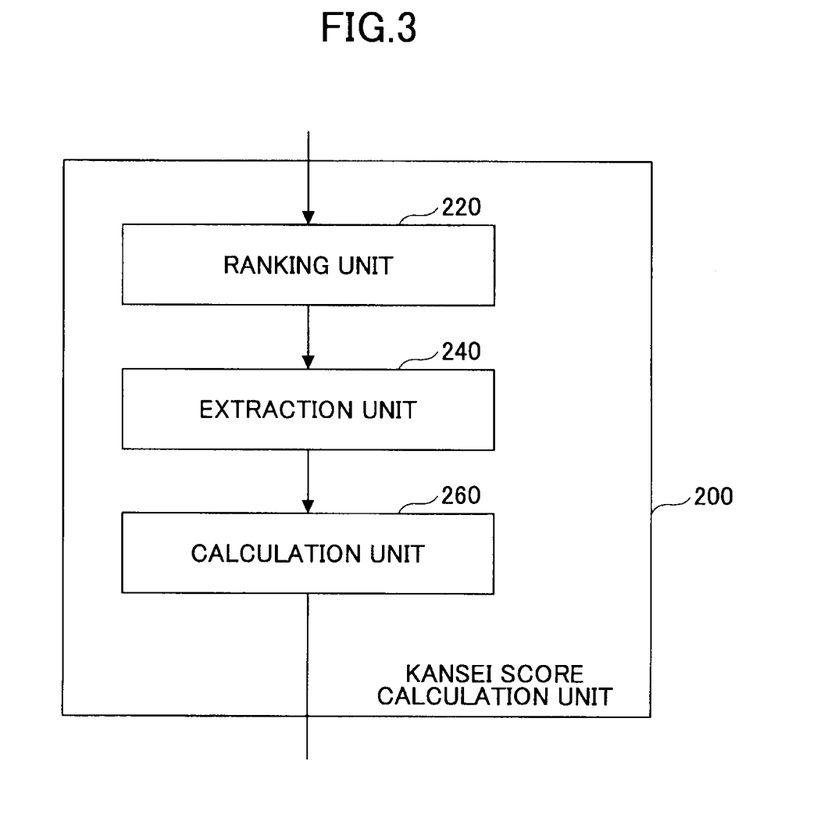
FIG. 3 is a block diagram of a Kansei score calculation unit according to an embodiment of the present invention.

FIG. 3 is a block diagram of the Kansei score calculation unit 200 according to an embodiment of the present invention.

As shown in FIG. 3, the Kansei score calculation unit 200 includes a ranking unit 220, an extraction unit 240, and a calculation unit 260. The ranking unit 220 may carry out ranking, in ascending order, with regard to the color histogram distances between all of the training images and the image waiting for processing. The extraction unit 240 may extract the top N (N is a counting number) training images having the minimum color histogram distance. N is an adjustable parameter, for example, 5 or 10. Then, by utilizing the Kansei scores of the extracted N training images, the Kansei score of the image waiting for processing is calculated (determined) by the calculation unit 260. As described above, a training image may have difference Kansei scores belonging to difference Kansei types; here it is necessary to carry out the calculations according to a Kansei type selected by the user, i.e., based on the Kansei score of the training image, belonging to the Kansei type selected by the user.

It is possible to calculate the Kansei score of the image waiting for processing by adopting various approaches. For example, it is possible to carry out averaging with regard to the Kansei scores of the N training images, and then let the averaged value be the Kansei score of the image waiting for processing, with regard to the corresponding Kansei type. Also it possible to carry out, by not considering a few training images having the maximum and minimum Kansei scores in the N training images, averaging with regard to the remaining training images, and then let the averaged value be the Kansei score of the image waiting for processing. In addition, the averaging method may be replaced by a method of calculating the mid-value. In a word, those people skilled in the art may determine the Kansei score of the image waiting for processing by using various approaches.

Furthermore, it is preferred that the image processing apparatus according to the embodiment of the present invention may receive an expected Kansei score input by the user. It is possible to understand for those people skilled in the art that as for the image waiting for processing, the user may designate the Kansei type, to which the expected Kansei score belongs, as one at least belonging to the Kansei types to which the Kansei scores calculated by the Kansei score calculation unit 200 belong. In what follows, both the Kansei score calculation processing with regard to the image waiting for processing and the adjustment processing with regard to the image waiting for processing by using the Kansei score are carried out on the basis that the user has determined a Kansei type.

The determination unit 300 may calculate the difference between the Kansei score $K_{input}$ of the image waiting for processing and the expected Kansei score $K_{expected}$, and then let the absolute value of the difference be a Kansei score difference $K_{gap}$, as shown in the following equation (6).

$$K_{gap}=|K_{expected}-K_{input}| \quad (6)$$

Then the Kansei score difference $K_{gap}$ is compared with a predetermine threshold value. If the Kansei score difference is less than or equal to the predetermined threshold value, then the image waiting for processing is sent to the output unit 500 to serve as an output image; otherwise the image waiting for processing is sent to the image adjustment unit 400 for carrying out adjustment with regard to image features.

Figure 4:
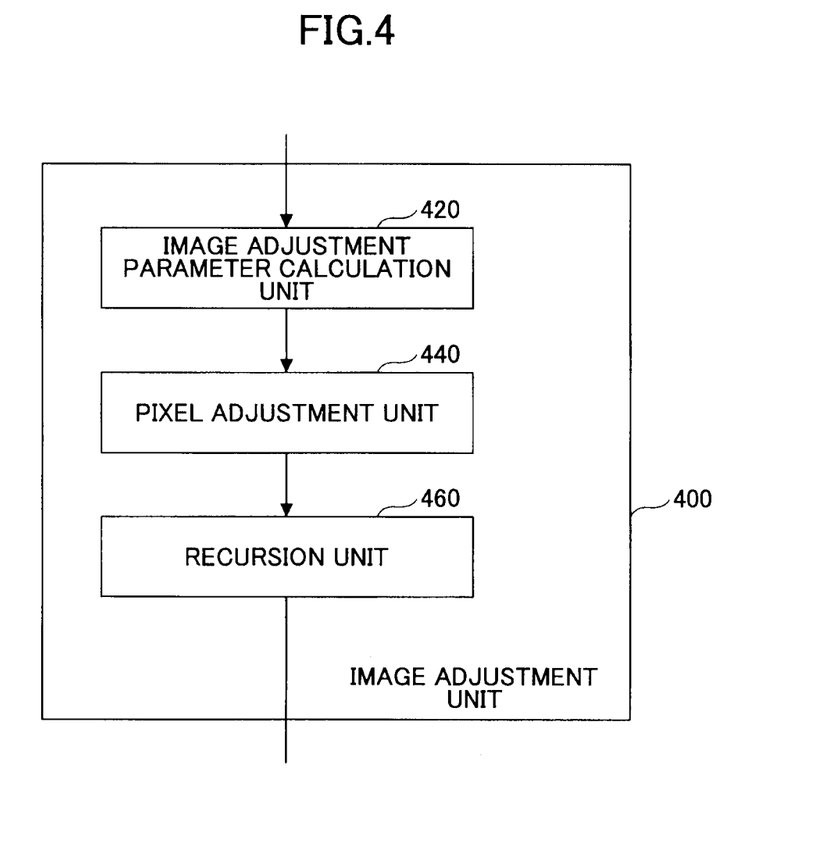
FIG. 4 is a block diagram of an image adjustment unit according to an embodiment of the present invention.

FIG. 4 is a block diagram of the image adjustment unit 400 according to an embodiment of the present invention.

As shown in FIG. 4, the adjustment unit 400 includes an image adjustment parameter calculation unit 420 configured to calculate an image adjustment parameter based on the Kansei score difference; a pixel adjustment unit 440 configured to adjust the respective pixels of the image waiting for processing by utilizing the image adjustment parameter; and a recursion unit 460 configured to provide the adjusted image waiting for processing to the matching degree calculation unit 100 to serve as a new image waiting for processing.

The image adjustment parameter calculation unit 420 may calculate the image adjustment parameter $P_\alpha$, by using, for example, the following equation (7).

$$P_\alpha = \alpha K_{gap} \quad (7)$$

Here α is an adjustable parameter; for example, it may be pre-determined as 0.5, or 0.3, 0.7, 1, 1.5, etc. The influence caused by pre-designating a range of the Kansei scores of the training images may be adjusted here. For example, since $K_{gap}$ is a difference value, the range of the Kansei score cannot affect this kind of difference value, and the influence of the size of the range, for example, 100 or 150, may also be adjusted by using α. As mentioned above, those people skilled in the art should understand that when designating Kansei scores of training images in a training image set, although normalization processing with regard to difference Kansei types is not carried out, the embodiments of the present invention may still be preformed. However, in order to illustrate easily, it is also possible to designate the Kansei scores of the training images in a same training image set with regard to different Kansei types as being in a same range.

The pixel adjustment unit 440 may adjust r, g, and b values of each pixel of the image waiting for processing to r', g', and b' values by utilizing, for example, the following equations (8)-(10).

$$r' = \begin{cases} (1+P_\alpha)\times r & \text{if } (1+P_\alpha)\times r < 255 \\ 255 & \text{if } (1+P_{ar})\times r \geq 255 \end{cases} \quad (8)$$

$$g' = g \quad (9)(9)$$

$$b' + (1-P_\alpha)\times b \quad (10)$$

Alternatively the pixel adjustment unit 440 may carry out adjustment with regard to each pixel of the image waiting for processing from r, g, and b values of the corresponding pixel to r'', g'', and b'' values by adopting, for example, the following equations (11)-(13).

$$r'' = \begin{cases} r+P_\alpha \times 50 & \text{if } r < 50 \\ (1+P_\alpha)\times r & \text{if } r \geq 50 \text{ and } (1+P_\alpha)\times r < 255 \\ 255 & \text{if } (1+P_\alpha)\times r \geq 255 \end{cases} \quad (11)$$

$$g'' = \begin{cases} g+P_\alpha \times 50 & \text{if } g < 50 \\ (1+P_\alpha)\times g & \text{if } g \geq 50 \text{ and } (1+P_\alpha)\times g < 255 \\ 255 & \text{if } (1+P_\alpha)\times g \geq 255 \end{cases} \quad (12)$$

$$b'' = (1-P_\alpha)\times b \quad (13)$$

In addition, the pixel adjustment unit 440 may also adjust image features by carrying out processing with regard to the h, s, and v values of the respective pixels of the image waiting for processing. For example, the pixel adjustment unit 440 may adjust h, s, and v values of the corresponding pixel to h', s', and v' values by utilizing, for example, the following equations (14)-(16).

$$h'=h \quad (14)$$

$$s'=(1+P_\alpha)\times s \quad (15)$$

$$v'=v \quad (16)$$

It is possible to convert the HSV values of the corresponding pixel to the RGB values by adopting one of conversion methods from the HSV color space to the RGB color space, prescribed by the ICC.

Furthermore it is possible to adopt different adjustment methods with regard to difference Kansei types. Of course, it is also possible to use a same adjustment method to carry out adjustment with regard to various Kansei types so as to obtain the adjusted image waiting for processing.

By utilizing the operation of the recursion unit 460, recursion processing is carried out with regard to the adjusted image waiting for processing until the determination unit 300 determines in a loop that the Kansei score difference is less than or equal to the predetermined threshold value.

In addition, according to another embodiment of the present invention, an image processing method is proposed which may be carried out by the image processing apparatus. The image processing method includes a matching degree calculation step, which may be carried out by the matching degree calculation unit 100, of calculating respective matching degrees between an image waiting for processing and plural training images whose Kansei scores are pre-designated; and a Kansei score calculation step, which may be carried out by the Kansei score calculation unit 200, of extracting, from the plural training images, a predetermined number of training images corresponding to the maximum matching degree, and then based on the Kansei scores of the extracted training images with regard to a selected Kansei type, calculate a Kansei score of the image waiting for processing.

The image processing method further includes a determination step, which may be carried out by the determination unit 300, of calculating a Kansei score difference between the Kansei score of the image waiting for processing and an expected Kansei score, with regard to the selected Kansei type, and then determining whether the Kansei score difference is greater than a predetermined threshold value; and an image adjustment step, which may be carried out by the image adjustment unit 400, of adjusting, in a case where the determination step determines that the Kansei score difference is greater than the predetermined threshold value, the image waiting for processing, and then providing the adjusted image waiting for processing to the matching degree calculation step to serve as a new image waiting for processing.

The matching degree calculation step may include a conversion step, which may be carried out by the conversion unit 120, of converting the image waiting for processing from a RGB color space to an HSV color space; a histogram calculation step, which may be carried out by the histogram calculation unit 140, of calculating a color histogram of the image waiting for processing in the HSV color space; and a histogram distance calculation step, which may be carried out by the histogram distance calculation unit 160, of calculating respective color histogram distances between the image waiting for processing and the plural training images to serve as the respective matching degrees of the plural training images.

The image adjustment step may include an image adjustment parameter calculation step, which may be carried out by the image adjustment parameter calculation unit 420, of calculating an image adjustment parameter based on the Kansei score difference; a pixel adjustment step, which may be carried out by the pixel adjustment unit 440, of adjusting respective pixel values of the image waiting for processing by using the image adjustment parameter; and a recursion step, which may be carried out by the recursion unit 460, of providing the adjusted image waiting for processing to the matching degree calculation step to serve as the new image waiting for processing.

The image processing method may further include an output step, which may be carried out by the output unit 500, of outputting, in a case where the determination step determines that the Kansei score difference is less than or equal to the predetermined threshold value, the image waiting for processing to serve as an output image.

A series of operations described in this specification may be executed by hardware, software, or a combination of the hardware and the software. When the operations are executed by the software, a computer program may be installed in a storage device of a dedicated built-in computer so that the dedicated built-in computer may execute the computer program. Alternatively, the computer program may be installed in a common computer by which various types of processes may be executed so that the common computer may execute the computer program.

For example, the computer program may be stored in a recording medium such as a hard disk or a ROM in advance. Alternatively, the computer program may be temporarily or permanently stored (or recorded) in a movable recording medium such as a floppy disk, a CD-ROM, a MO disk, a DVD, a magic disk, or a semiconductor storage unit. In addition, it is possible to have these kinds of movable recording media serve as packaged software for purpose of distribution.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201110042595.3 filed on Feb. 22, 2011, the entire contents of which are hereby incorporated by reference.

What is claimed is:

1. An image processing apparatus comprising:
    circuitry configured to:
    calculate respective matching degrees between an image waiting for processing and plural training images whose Kansei scores are pre-designated;
    extract, from the plural training images, a predetermined number of training images corresponding to the maximum of the matching degrees, and then based on the Kansei scores of the extracted training images with regard to a selected Kansei type, calculate a Kansei score of the image waiting for processing;
    calculate a Kansei score difference between the Kansei score of the image waiting for processing and an expected Kansei score with regard to the selected Kansei type, and then determine whether the Kansei score difference is greater than a predetermined threshold value; and
    adjust, in a case where the Kansei score difference is greater than the predetermined threshold value, the image waiting for processing, and then provide the adjusted image waiting for processing to serve as a new image waiting for processing.

2. The image processing apparatus according to claim 1, wherein the circuitry is configured to:
    convert the image waiting for processing from a RGB color space to an HSV color space;
    calculate a color histogram of the image waiting for processing in the HSV color space; and
    calculate respective color histogram distances between the image waiting for processing and the plural training images to serve as the respective matching degrees of the plural training images.

3. The image processing apparatus according to claim 1, wherein the circuitry is configured to:
    calculate an image adjustment parameter based on the Kansei score difference;
    adjust respective pixel values of the image waiting for processing by using the image adjustment parameter; and
    provide the adjusted image waiting for processing to serve as the new image waiting for processing.

4. The image processing apparatus according to claim 1, wherein the circuitry is configured to:
    output, in a case where the Kansei score difference is less than or equal to the predetermined threshold value, the image waiting for processing to serve as an output image.

5. An image processing method comprising:
    a matching degree calculation step of calculating, via circuitry of an image processing apparatus, respective matching degrees between an image waiting for processing and plural training images whose Kansei scores are pre-designated;
    a Kansei score calculation step of extracting, via the circuitry and from the plural training images, a predetermined number of training images corresponding to the maximum of the matching degrees, and then based on the Kansei scores of the extracted training images with regard to a selected Kansei type, calculating, via the circuitry, a Kansei score of the image waiting for processing;
    a determination step of calculating, via the circuitry, a Kansei score difference between the Kansei score of the image waiting for processing and an expected Kansei score with regard to the selected Kansei type, and then determining, via the circuitry, whether the Kansei score difference is greater than a predetermined threshold value; and
    an image adjustment step of adjusting, via the circuitry and in a case where the determination step determines that the Kansei score difference is greater than the predetermined threshold value, the image waiting for processing, and then providing, via the circuitry, the adjusted image waiting for processing to the matching degree calculation step to serve as a new image waiting for processing.

6. The image processing method according to claim 5, wherein, the matching degree calculation step comprises:
   a conversion step of converting, via the circuitry, the image waiting for processing from a RGB color space to an HSV color space;
   a histogram calculation step of calculating, via the circuitry, a color histogram of the image waiting for processing in the HSV color space; and
   a histogram distance calculation step of calculating, via the circuitry, respective color histogram distances between the image waiting for processing and the plural training images to serve as the respective matching degrees of the plural training images.

7. The image processing method according to claim 5, wherein, the image adjustment step comprises:
   an image adjustment parameter calculation step of calculating, via the circuitry, an image adjustment parameter based on the Kansei score difference;
   a pixel adjustment step of adjusting, via the circuitry, respective pixel values of the image waiting for processing by using the image adjustment parameter; and
   a recursion step of providing, via the circuitry, the adjusted image waiting for processing to the matching degree calculation step to serve as the new image waiting for processing.

8. The image processing method according to claim 5, further comprising:
   an output step of outputting, via the circuitry and in a case where the determination step determines that the Kansei score difference is less than or equal to the predetermined threshold value, the image waiting for processing to serve as an output image.

* * * * *